United States Patent
Carstens (10) Patent No.: US 12,338,796 B2
(45) Date of Patent: Jun. 24, 2025

(54) FLOW POWER PLANT HAVING PIVOTING BLADES

(71) Applicant: Bahne Carstens, Bovenden (DE)

(72) Inventor: Bahne Carstens, Bovenden (DE)

(*) Notice: Subject to any disclaimer, the term of this patent is extended or adjusted under 35 U.S.C. 154(b) by 0 days.

(21) Appl. No.: 18/416,343

(22) Filed: Jan. 18, 2024

(65) Prior Publication Data

US 2024/0191692 A1    Jun. 13, 2024

Related U.S. Application Data

(63) Continuation of application No. PCT/EP2022/070287, filed on Jul. 20, 2022.

(30) Foreign Application Priority Data

Jul. 22, 2021    (DE) .................. 10 2021 118 953.5

(51) Int. Cl.
*F03D 7/06*        (2006.01)
*F03B 17/06*       (2006.01)
(Continued)

(52) U.S. Cl.
CPC .............. *F03D 7/06* (2013.01); *F03B 17/065* (2013.01); *F03D 3/067* (2013.01); *H02K 7/116* (2013.01);
(Continued)

(58) Field of Classification Search
CPC ........... F03D 7/06; F03D 3/067; H02K 7/116; H02K 7/1823; F05B 2260/76
See application file for complete search history.

(56) References Cited

U.S. PATENT DOCUMENTS

| 291,766 A | * | 1/1884 | Petersen | .................. B63H 5/02 |
| | | | | 416/119 |
| 315,263 A | * | 4/1885 | Emmett | .................. B63H 5/02 |
| | | | | 416/101 |

(Continued)

FOREIGN PATENT DOCUMENTS

| DE | 19718048 A1 | 11/1998 |
| JP | 2013139741 A | 7/2013 |
| WO | 2013100160 A1 | 7/2013 |

OTHER PUBLICATIONS https://de.wikipedia.org/wiki/Klappfl%C3%BCgel-Rotor#/media/Datei:Klapprotor_13.gif (GIF of a so-called Chinese windmill / wind turbine, Wikipedia Article "Klappflügel-Rotor") (downloaded Feb. 14, 2024).

(Continued)

*Primary Examiner* — Tulsidas C Patel
*Assistant Examiner* — Thomas K Quigley
(74) *Attorney, Agent, or Firm* — Thomas | Horstemeyer, LLP (57) ABSTRACT

A flow power plant comprises a rotor rotating about a rotation axis and having a plurality of pivoting blades. Each pivoting blade is mounted to the rotor for pivoting between a position pivoted-in towards and a position pivoted-out away from the rotation axis. One separate electric machine operable both as a motor and as a generator is assigned to each pivoting blade for applying torques between the rotor and the pivoting blade. A controller separately controls the separate electric machines during each revolution of the respective pivoting blade together with the rotor around the rotation axis in such a way that a predetermined course of a pivot angle of the respective pivoting blade results between the pivoted-in position and the pivoted-out position. The predetermined course of the pivot angle is predetermined for (Continued)

a maximum recovery of energy from a flow flowing against the rotor transversely to the rotation axis.

20 Claims, 7 Drawing Sheets

(51) Int. Cl.
  *F03D 3/06* (2006.01)
  *H02K 7/116* (2006.01)
  *H02K 7/18* (2006.01)
(52) U.S. Cl.
  CPC ........ *H02K 7/1823* (2013.01); *F05B 2210/16* (2013.01); *F05B 2260/76* (2013.01); *F05B 2260/96* (2013.01); *F05B 2270/334* (2013.01)

(56) References Cited

U.S. PATENT DOCUMENTS

| | | | | |
|---|---|---|---|---|
| 1,076,713 | A * | 10/1913 | Southwick | F03D 3/067 416/212 A |
| 5,553,996 | A * | 9/1996 | Farrar | F03D 3/062 415/4.2 |
| 7,911,076 | B2 * | 3/2011 | Stephens | F03D 3/04 290/55 |
| 8,664,784 | B2 * | 3/2014 | Janca | F03B 13/10 290/43 |
| 8,994,204 | B2 * | 3/2015 | Pai | F03B 17/067 290/54 |
| 10,648,452 | B1 * | 5/2020 | Galstyan | F03D 3/0409 |
| 2007/0296218 | A1 * | 12/2007 | Jonsson | F03D 3/068 290/55 |
| 2009/0016884 | A1 * | 1/2009 | Yan | F03D 3/068 416/147 |
| 2009/0136346 | A1 * | 5/2009 | Kelly | F03D 3/005 416/119 |
| 2011/0006526 | A1 * | 1/2011 | Hemmingsson | F03D 3/068 290/44 |
| 2011/0255972 | A1 * | 10/2011 | Lew | F03D 3/067 416/111 |
| 2011/0272946 | A1 * | 11/2011 | Kumano | F03B 17/065 60/639 |
| 2011/0305569 | A1 | 12/2011 | Kim | |
| 2015/0001850 | A1 * | 1/2015 | Jaw | F03D 3/067 290/55 |
| 2016/0298605 | A1 * | 10/2016 | Brendle | F03D 7/06 |
| 2018/0038344 | A1 * | 2/2018 | Elayyan | F03D 7/06 |
| 2019/0360465 | A1 * | 11/2019 | Moore | F03D 3/005 |

OTHER PUBLICATIONS https://de.wikipedia.org/wiki/Klappfl%C3%BCgel-Rotor#/media/Datei:Klapprotor_15.tif (Tiff of Wikipedia Article "Klappflügel-Rotor") (downloaded Jan. 16, 2024).
International Preliminary Report on Patentability and Written Opinion in related PCT application No. PCT/EP2022/070287, mailed Jan. 18, 2024.

* cited by examiner

FLOW POWER PLANT HAVING PIVOTING BLADES

CROSS REFERENCE TO RELATED APPLICATIONS

This application is a continuation of international application PCT/EP2022/070287 filed on Jul. 20, 2022, entitled "Strömungskraftanlage mit Schenkflügeln," and claiming priority to German patent application No. 10 2021 118 953.5 filed on Jul. 22, 2021.

FIELD OF THE INVENTION

The invention relates to a flow power plant comprising a rotor and a plurality of pivoting blades pivoted to the rotor.

A flow power plant serves for extracting energy from a flow flowing against it to utilize this energy, particularly, in that the flow power plant converts the kinetic energy extracted from the flow into electric energy.

Generally, the flow flowing against the flow power plant may be a flow of any fluid. Air and water flows are of particular practical interest. In other words, the flow power plant may, particularly, be a wind power plant or a water power plant.

BACKGROUND OF THE INVENTION

A so-called Chinese windmill or Chinese wind turbine, see for example https://de.wikipedia.org/wiki/Klappfl % C3% BCgel-Rotor #/media/Datei:Klapprotor_13.gif, is an embodiment of a so-called folding wing rotor comprising pivoting axes of a plurality of folding wings, which are parallel to a rotation axis of the rotor. The folding wings automatically orient themselves towards to the incoming flow, transversely to the flow on the advancing side of the rotor and in direction of the flow on the returning side of the rotor. There is no active actuation of the wings. Particularly at higher rotational speed of the rotor, there is a danger that the folding wings pivot out of their target position in an uncontrolled way.

In a known rotor having pivoting blades which are pivoted by an incoming flow, see https://de.wikipedia.org/wiki/Klappfl % C3% BCgel-Rotor #/media/Datei:Klapprotor_15.tif, a maximum opening angle of the pivoting blades pivoted out of the base body of the rotor is limited depending on the velocity of the flow. The limitation to the opening angle is implemented with the aid of a control flap against which the flow flows and which pulls control cables when it is raised by the flow.

The blades of a Voith-Schneider-propeller are mounted for pivoting about pivoting axes which are parallel to each other at an outer circumference of a rotor which rotates about a rotation axis parallel to the pivoting axes. Pivot angles of the blades around their pivoting axes are positively controlled by a mechanism such that the pivot angles with respect to the rotor vary dependently on the angle of rotation of the rotor. A driven Voith-Schneider-propeller generates a propulsion transverse to the rotation axis of the rotor. Generally, a Voith-Schneider-propeller could also be used as a turbine of a flow power plant. In contrast to a usual flow power plant having a rotation axis of the rotor running transversely to the flow, a Voith-Schneider-propeller would have to be turned into the flow. Practical application of Voith-Schneider-propellers as turbines of flow power plants are not known.

A Savonius-rotor is a wind turbine with two or more bucket-shaped wings which overlap each other and which are elongated and mounted between circular end plates. With a vertical rotation axis, an incoming air flow rotates a Savonius-rotor about its rotation axis independently of the wind direction. A Savonius-rotor may be constructed in a simple way. However, the efficiency of flow power plants with Savonius-rotors related to the total construction effort is inadequate for the construction of such flow power plants being profitable as compared to other wind power plants.

A Darrieus-rotor is a wind turbine for wind power plants with vertical rotation axis. Wings of a Darrieus-rotor rotating about the rotation axis are generally fixed with respect to the circumference of the rotor. Opposite aerodynamic forces onto the wings result in a Darrieus-rotor with two wings against which a flow flows transversely to its rotation axis. Thus, a Darrieus-rotor does not start-up by itself. Once started-up, like, for example, by means of a rigidly coupled Savonius-rotor, there are different flows against the wings. From this, different aerodynamic forces and a torque onto the rotor result. It is known that a blade angle adjustment depending on the wind direction may enhance the start-up behavior and the efficiency of Darrieus-rotors.

A wind power plant comprising a rotor and a housing, and designated as a "wind motor-dragonfly" is known from German patent application publication DE 197 18 048 A1. In the housing, a rotor with an inner ring and a plurality of pivoting wind blades is arranged in a first center point, a circular cam track for guiding the wind blades is arranged in a second center point, and wind guiding sheets are arranged at the housing wall in direction of a narrowing overlap of inner ring and cam track. The wind blades are pivoted to the inner ring and they are guided in the cam track like cam followers. The wind blades pivoted to the inner ring orient themselves fully against the wind. Two such wind motor-dragonflys comprising rotors rotating about parallel rotating axes may be arranged in a common housing with inner and outer wind guiding sheets.

In a flow power plant comprising a rotor having pivoting blades which is known from Japanese patent application JP 2013-139741 A and international application publication WO 2013/100 160 A1 belonging to the same patent family, pivot angles of a plurality of pivoting blades can together be adjusted by rotating a setting ring by means of an electric drive with respect to the rotor. The setting ring is rotated with the electric drive with respect to the rotor about the rotation axis and acts onto the pivoting blades via levers linked to the rotor and to the pivoting blades. In the known flow power plant, the pivoting blades are not pivoted between their position pivoted-in towards the rotation axis and the position pivoted-out away from the rotation axis with respect to the rotor during the revolutions of the rotor, but all pivoting blades constantly have the pivot angle with respect to the rotor adjusted by means of the electric drive, the setting ring and the levers.

There still is a need of a flow power plant comprising a rotor and at least one pivoting blade pivoted to the rotor, whose operation is automatically optimizable, particularly with the objective of a maximum yield of energy.

SUMMARY OF THE INVENTION

The present invention relates to a flow power plant. The flow power plant comprises a rotor mounted to a basis for rotation about a rotation axis; a plurality of pivoting blades, each pivoting blade of the plurality of pivoting blades being mounted to the rotor for pivoting about a pivoting axis which is parallel to the rotation axis between a position pivoted-in towards the rotation axis and a position pivoted-out away from the rotation axis; a plurality of separate electric machines mounted to the rotor, each separate electric machine of the plurality of separate electric machines being assigned to one pivoting blade of the plurality of pivoting blades, the separate electric machine being configured and arranged for applying torques between the rotor and the one pivoting blade around the pivoting axis of the one pivoting blade; and a controller for pivot angles of the plurality of pivoting blades around the pivoting axes with respect to the rotor, the controller separately controlling the separate electric machines of the plurality of separate electric machines. Each separate electric machine of the plurality of separate electric machines is operable both as a motor and as a generator. The controller is configured and connected for controlling each separate electric machine of the plurality of separate electric machines during each revolution of the one pivoting blade together with the rotor around the rotation axis in such a way that a predetermined course of the pivot angle of the one pivoting blade between the pivoted-in position and the pivoted-out position is resulting, the predetermined course of the pivot angle being predetermined for the respective revolution.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

In the flow power plant according to the present disclosure, the flow power plant comprising a rotor mounted for rotation about a rotation axis and a plurality of pivoting blades which are each mounted to the rotor for rotation about a pivoting axis parallel to the rotation axis between a position pivoted into the rotor and a position pivoted out of the rotor, a separate electric machine is assigned to each pivoting blade. The electric machine is configured and arranged for applying torques between the rotor and the respective pivoting blade around the pivoting axis. The flow power plant further comprises a controller controlling the electric machine for a pivot angle of the respective pivoting blade around the pivoting axis with respect to the rotor. The controller is configured and connected for controlling the electric machine during each revolution of the respective pivoting blade together with the rotor around the rotation axis such that a course of its pivot angle around its pivoting axis with respect to the rotor results that is intended for the respective revolution.

That an electric machine is configured for applying torques between the rotor and the respective pivoting blade around the pivoting axis does not only mean that a plurality of electric machines is provided for the plurality of pivoting blades, but also that this plurality of electric machines are controllable by the controller independently of one another. Further, that the electric machine is configured for applying torques between the rotor and the respective pivoting blade around the pivoting axis means that the pivoting of the respective pivoting blade about its pivoting axis depends not only on these torques but also on further forces and momentums, which are active between the rotor and the respective pivoting blade. These forces and momentums particularly include aerodynamic forces onto the pivoting blade due to an external flow flowing against it. Further, the forces and momentums include centrifugal forces onto the respective pivoting blade, friction forces and any elastic forces, which become active between the respective pivoting blade and the rotor. The electric machine is controlled by the controller such that the sum of the torques active between the rotor and the respective pivoting blade in the flow flowing against the flow power plant exactly results in that course of the pivoting angle of the respective pivoting blade which is intended for the respective revolution of the respective pivoting blade together with the rotor around the rotation axis. In other words, in the flow power plant according to the present disclosure, the passive pivoting of the pivoting blades by the flow flowing against them in the known rotor having pivoting blades is not replaced by an active pivoting of the respective pivoting blade. Instead, the electric machine is used to modify the pivoting induced by the incoming flow in such a way that the course of the pivot angle of the respective pivoting blade intended for the respective revolution of the pivoting blade is realized. This particularly includes that an uncontrolled pivoting of the respective pivoting blade about its pivoting axis is inhibited by means of the electric machine. Further, it can be inhibited that the respective pivoting blade strikes against the rotor in a hard way, when it reaches its pivoted-out position or its pivoted-in position. Particularly, the electric machine can be used to start the pivoting-out of the pivoting blade into its pivoted-out position earlier than it would be induced by the incoming flow. In a same way, the pivoting-in of the respective pivoting blade may be started earlier by means of the electric machine than it would be induced by the incoming flow. The latter may especially take place in a way which further accelerates the rotor in the incoming flow, as it will be further described below.

As already made clear by the above remarks, not only the respective size of the pivot angle at the respective position of the pivoting axis of the pivoting blade around the rotation axis of the rotor but also the pivot angular velocity of the pivoting blade, i.e., the derivative of the pivot angle with respect to time, is relevant for the course of the pivot angle of the respective pivoting blade around its pivoting axis. In other words, the controller may also be configured for realizing a predetermined course of a pivot angular velocity of the respective pivoting blade for the respective revolution of the rotor around the rotation axis. Controlling the electric machine by means of the controller takes place by subjecting the electric machine to electric currents of different amperages. The torques around the pivoting axis, or forces that act at a lever arm around the pivoting axis as torques, are applied via these electric currents.

By means of the one electric machine per pivoting blade and the controller controlling it, a basis for an automatically optimizable operation of the flow power plant is provided, particularly with regard to a maximum yield of energy from the flow flowing against the flow power plant. In this way, it is achieved that much electric energy is generated at a small installation size. Thus, the flow power plant according to the present disclosure may, for example, be positioned in a garden where no plants are wanted that lash around over a wide range. With its building height, the flow power plant according to the present disclosure gains efficiency without needing a bigger platform.

An automatic optimization of the controller in the running operation of the flow power plant may, for example, be based on machine learning or otherwise take place with the aid of artificial intelligence.

Preferably, each pivoting blade of the flow power plant according to the present disclosure is, in its pivoted-in position, arranged within a basic shape of the rotor, which is formed as a body of revolution about the rotation axis. The pivoted-in pivoting blade may form a part of this basic shape of the rotor. This basic shape may be a cylinder section having a cylinder axis coinciding with the rotation axis of the rotor. The basic shape may, however, also be barrel-shaped or a surface line which is curved in another way or kinked.

The pivoting of the pivoting blades over their respective revolution around the rotor axis may be predetermined on the basis of actual values of external parameters like the velocity and the direction of the flow flowing against them, and be read out of a table based on the values of these parameters for this purpose. The controller may also be configured for automatically optimizing the pivoting of the pivoting blades. For the purpose of this optimization, the controller may set the course of the pivoting angle differently by way of trial. For example, the angle positions of the pivoting axes of the pivoting blades around the rotation axis of the rotor, at which the pivoting-out and the pivoting-in of the pivoting blades are started, may be varied with respect to the direction of the flow flowing against them. In a same way, the maximum pivot angle and the course of a pivot angular velocity of the pivoting blades with regard to the rotor may be varied. Additionally, the values of the external parameters present during the respective revolution, and the electric currents in the electric machines needed for realizing the pivot angles and pivot angle velocities of the pivoting blades, and the kinetic energy transferred out of the incoming flow onto the rotor during the respective revolution, and the time needed for the respective revolution may be recorded. An evaluation of these data over many revolutions of the pivoting blades with different courses of their pivot angles with regard to the rotor allows for optimizing this course with the objective of a maximum transfer of energy out of the incoming flow, and then to set it accordingly for the next revolution at the same values of the external parameters. The data obtained during previous revolutions of the pivoting blades around the rotation axis may be laboratory data obtained during the development of the flow power plant according to the present disclosure, and/or data from the current operation of the flow power plant according to the present disclosure.

The controlling of the separate electric machines of the flow power plant according to the present disclosure may additionally also take place such that occurring vibrations, particularly resonances at the rotation frequency or a harmonic of the rotation frequency of the rotor, are suppressed or at least reduced. For this purpose, the controller may be connected to a vibration sensor of the flow power plant and configured for controlling the separate electric machines differently in such a way that vibrations at the rotation frequency or the harmonic of the rotation frequency of the motor which are registered by the vibration sensor are reduced. The different controlling of the electric machines may mean that the different electric machines are differently controlled over the same revolution of the rotor around its rotation axis such that different courses of the pivoting angles of the individual pivoting blades result. Alternatively or additionally, the electric machines may be differently controlled over subsequent revolutions of the rotor around the rotation axis. By nature, the differences in the controlling of the separate electric machines result in a variation of the efficiency of the flow power plant according to the present disclosure. However, if these variations occur around the maximum efficiency of the flow power plant, the associated losses of yield of energy are only small and a small price for reducing the vibrations which will not only be associated with increased operational noise of the flow power plant but also with impairments of its lifetime or, in case of a so-called resonance catastrophe, even in a short-term destruction of the flow power plant. The controller of the flow power plant according to the present disclosure may also be designed such that it generally avoids rotational speeds of the rotor at which these resonances occur by adjusted controlling of the electric machines. In doing so, the controller may consider the present values of the parameters of the flow flowing against the flow power plant which have an influence on the tendency of the flow power plant towards vibrations at a certain rotational speed of the rotor. The controller may register the relevant parameters and their influence on the tendency of the flow power plant towards vibrations in the running operation of the flow power plant with the aid of machine learning. By continuously monitoring these parameters together with the rotational speed of the rotor, the controller may then acknowledge and avoid the danger of vibrations and resonances even before the vibrations and resonances actually occur.

Even quite fundamentally, the optimization of the controller with respect to avoiding vibrations and resonances with the aid of machine learning may take in the running operation of the flow power plant.

Further, the controller of the flow power plant according to the present disclosure may limit the rotation frequency or rotational speed of the rotor at strong wind in that it limits the maximum pivot angle of the pivoting blades with respect to the rotor or, in an extreme case, holds the pivoting blades in their completely pivoted-in positions.

Generally, it is possible to deduce the actual values of the parameters of the flow flowing against the flow power plant from variations of the predetermined courses of the pivot angles and the variations of the energies transferred to the rotor resulting therefrom. Alternatively or additionally, the values of the parameters of the flow flowing against the flow power plant may be separately registered by a device common for this purpose. The essential parameters are the direction and the velocity of the flow flowing against the flow power plant.

In order to be able to apply torques around the pivoting axes of the pivoting blades with respect to the rotor in any direction, the electric machines have to be operable at least as a motor and as a brake. Preferably, they are operable as a motor and a generator such that, in decelerating the pivoting blades, electric energy is generated. Alternatively, the electric machines may each include a motor and an electrically separate generator. In principle, this alternative shall be included in the following description. As a rule, the electric machines have no transmission, also for simplifying the operation of the electric machines as generators. The electric machines may be rotating electric machines comprising a rotor mounted for rotation about the respective pivoting axis. However, the electric machines may also comprise a linear motor engaging the rotor and the respective pivoting blade via joints.

If the electric machines are also operable as generators, an energy buffer storage mounted to the rotor and rotating with the rotor about the rotation axis may be configured and connected in the flow power plant according to the present disclosure for temporarily storing electric energy recovered in the operation of the electric machines as generators. If, in the average, this electric energy is released over a plurality of revolutions of the rotor in operation of the electric machines as motors, and the electric energy recovered from the operation of the electric machines as generators is also sufficient for their operation as motors, there is no need for an electric supply to the electric machines rotating with the rotor about the rotation axis via sliding contacts or the like. Such sliding contacts or the like are not needed for the control and its controlling of the electric machines. For this purpose, there may be a wireless signal transfer between a non-rotating part of the controller and a part of the controller rotating with the rotor and the electric machines about the rotation axis.

An operation of the electric machines as generators in which electric energy is recovered may particularly occur, when the pivoting-out of the respective pivoting blade is decelerated against the influence of the incoming flow by means of the electric machines. On the one hand, the electric machines may particularly be operated as motors, when the respective pivoting blade shall start to pivot-out earlier than aerodynamic forces due to the flow flowing against the rotor are available for this purpose. On the other hand, the electric machines may be operated as motors to pivot-in the respective pivoting blade before aerodynamic forces due to the incoming flow cause this pivoting-in. If more electric energy is available from the operation of the electric machines as generators than at least used for operating the electric machines as motors for these two purposes, the controller may control the electric machines for such a pivoting of the respective pivoting blades out of its pivoted-out position into its pivoted-in position that the rotor is accelerated due to a resulting rudder-movement of the respective pivoting blade in the flow flowing against it. Thus, there is a transfer of energy from the energy buffer storage arranged on the rotor in form of kinetic energy to the rotor. Thus, the electric energy recovered in operation of the electric machines as generators is preferably temporarily stored in the energy buffer storage and completely used up in the operation of the electric machines as generators. In order to have more electric energy available for the rudder-movement of the pivoting blades in this concept, the pivoting-out of the pivoting blades which is decelerated against the influence of the incoming flow by means of the electric machines operated as generators may take place up to clearly larger pivot angles of the pivoting blades than they would be required for orienting the pivoting blades transversely to the incoming flow.

Additionally, an electro motor may be mounted to the rotor of the flow power plant according to the present disclosure, by which torques around the rotation axis may be applied between the rotor and a torque proof basis. When the controller operates the electro motor with electric energy out of the energy buffer storage, any electric energy out of the energy buffer may be transferred to the rotor in form of kinetic energy. Further, the electric motor may be used to securely start-up the flow power plant, even if it only has two pivoting blades axially symmetrically arranged with regard to the rotation axis of the rotor. The electro motor is to be designed such that it puts an as small as possible resistance against the rotations of the rotor about the rotation axis in idling without transfer of torques around the rotation axis, and that it has no need of idling energy. When the electro motor is also operable as a generator, the energy buffer may be loaded with its aid, if the pivoting of the pivoting blades with the electric machines consumes more energy than recovered.

If the rotor is mechanically connected to a main generator of the flow power plant, this additional kinetic energy of the rotor is reconverted to electric energy by the main generator. The transfer of the electric energy which has been generated on the rotating rotor to the torque proof basis in this kinetic way does not require any electric sliding contacts or the like. The main generator of the flow power plant may be connected or connectable to at least one of an electric load and an energy storage for electric energy.

The automatic optimization of the operation of the flow power plant according to the present disclosure may not result in an uniform angular velocity of the rotor during its rotations about the rotation axis. Then, the electric energy output by the main generator of the flow power plant per time unit, i.e., its electric power, also varies over each revolution of the rotor around its rotation axis. The respective load connected to the main rotor has to tolerate these variations, or these variations are to be leveled by means of a suitable energy storage like, for example, a buffer capacitor.

The controller of the flow power plant according to the present disclosure is preferably configured and connected for registering an electric power supplied by the main generator of the flow power plant to the at least one of the load and the energy storage. This electric power is the energy per time unit taken with the flow power plant out of the flow flowing against the rotor, and serves as a basis for the automatic optimization of the course of the pivot angle of the at least one pivoting blade by means of the controller of the flow power plant according to the present disclosure.

Additionally, the controller may be configured and connected for operating the main generator to optimize an angular velocity of the rotor around the rotation axis by means of the main generator. This optimization may also be made with the objective of a maximum transfer of energy from the flow onto the rotor. In order to achieve this optimization, the controller may vary the currents flowing from the main generator and thus the electric power and thus the rotational resistance which the main generator exerts against the rotations of the rotor, and thus, at the end, vary the angular velocity of the rotor around its rotation axis. In doing so, it may be advantageous, if the main generator is reversible with regard to its effective direction to such an extent that it may also be used as a rotation drive for the rotor. An operation of the main generator as a motor may also be used for securely starting-up the flow power plant, even if it only has two pivoting blades axially symmetrically arranged with regard to the rotation axis of the rotor. With three or more pivoting blades, the flow power plant according to the present disclosure, as a rule, already starts-up due to the flow flowing against its rotor, even without controlling the electric machines assigned to the pivoting blades by means of the controller, i.e., even without electric supply to the controller. For such an automatic start-up of the flow power plant according to the present disclosure, it is often sufficient that its pivoting blades, for example by means of a spring, are to a small extent forced-out of their completely pivoted-in pivoting position such that they are further pivoted-out due to the incoming flow. As, in the flow power plant according to the present disclosure, a higher number of pivoting blades means a higher number of electric machines and thus a high apparatus expenditure, a rotor of a flow power plant according to the present disclosure typically has not more than six pivoting blades.

The rotor of the flow power plant according to the present disclosure may have an inner cylinder coaxially arranged with regard to its rotation axis, which is arranged between two end plates rigidly connected thereto and having a larger diameter than that one of the inner cylinder. Between these end plates, the pivoting blades may then be mounted for pivoting about their pivoting axes with respect to the rotor. Besides the inner cylinder, the rotor may have a plurality of flow bodies rigidly connected to the inner cylinder and arranged around the inner cylinder and having front sides oriented in rotation direction of the rotor about the rotation axis and back sides facing against the rotation direction, the flow bodies being effective as rigid blades of the rotor. This means that the rotor, even without the pivoting blades, is set to rotation by the incoming flow transverse to its rotation axis due to aerodynamic forces. Then, the pivoting axes of the pivoting blades preferably run in the areas of radially outwardly arranged trailing edges of the flow bodies and parallel thereto. In other words, the pivoting blades, with regard to the rotation direction of the rotor about its rotation axis follow to the back of the flow bodies. Preferably, no larger openings remain between the trailing edges of the flow bodies and the pivoting blades. To the contrary, the pivoting blades, even in their positions pivoted-in towards the pivoting axis may end at distances of at least 10° in front of the front sides of the following flow bodies in circumferential direction around the rotation axis such that openings between the pivoting blades and the respective following flow bodies remain here. These openings may support the pivoting-out of the pivoting blades due to the flow against the rotor in transverse direction to its rotation axis in that they guide a part of the incoming flow into chambers at the inner sides of the pivoting blades. In this embodiment of the flow power plant of the present disclosure, the flow bodies may be hollow profile sections.

In a special embodiment, the flow power plant according to the present disclosure comprises two rotors having pivoting blades which are arranged in a mirror-symmetric way with regard to a longitudinal center plane of a flow channel and run in opposite directions around their rotation axes. Thus, the rotation axes of the two rotors run in parallel to one another and, typically, at such a distance that the pivoted-out pivoting blades at the rotors running in opposite directions around their rotation axes do just not collide. Then, the flow channel is at least predominately blocked by pivoting-out the pivoting blades into their pivoted-out positions. Then, the flow may only pass through to the flow channel under rotating the rotors with the pivoted-out pivoting blades. The flow channel may be at least one of defined and delimited by flow guiding elements. In the embodiment of the flow power plant according to the present disclosure with two rotors, the controller may synchronize the individual rotors, for example, to every time simultaneously move the pivoted-out pivoting blades, at the rotors rotating about their rotating axes in opposite directions, through the distance of the two rotation axes.

An angle transmitter may be provided for monitoring the present pivot angle of the respective pivoting blade around its pivoting axis with respect to the rotor. A further angle transmitter may monitor the rotation angle of the rotor around its rotation axis with regard to a torque proof basis. It is also possible to monitor the pivot angle of the pivoting blade by means of an integrated sensor of the respective electric machine and the rotation angle of the rotor by means of an integrated sensor of the main generator so far as these sensors monitor the pivot angle or rotation angle at a sufficient accuracy for operating the flow power plant according to the present disclosure.

For monitoring the electric currents by which the controller controls the electric machines for applying the torque between the pivoting blades and the rotor and also for monitoring electric currents in the main generator, special current sensors may be provided, if the controller is not able to monitor these currents otherwise in that it sets these currents itself or has access to suitable sensors of the main generator.

Preferably, the controller of the flow power plant according to the present disclosure digitally controls the currents in the electric machines and from the main generator. The currents may be adjusted by a switching matrix in, for example, 256 equal steps. In that the current which flows from the main generator is controlled digitally, the flow power plant according to the present disclosure does not deliver so much current as recommended by the load but so much current is supplied as required for an optimized operation of the flow power plant according to the present disclosure. During each revolution of the rotor around its rotation axis, there may be several points in time at which no current flows from the main generator, i.e., temporarily, no electric power is provided.

The flow power plant according to the present disclosure allows for a complete energy management with regard to the transfer of kinetic energy from the incoming flow onto the pivoting blades, and between the pivoting blades and the rotor, and from the rotor to the main generator. At the same time, the electric energy is controlled, that drives the electric machines by which the pivoting blades are pivoted about their pivoting axes with respect to the rotor as motors, or that the electric machines generate as generators. Further, the electric energy out of the energy buffer storage that is eventually transferred via the electric motor is also controlled. The controller also controls the electric energy led away from the flow power plant. All this takes place with the objective of a maximization of the yield of energy from the flow flowing against the flow power plant.

DESCRIPTION OF THE FIGURES

Figure 1:
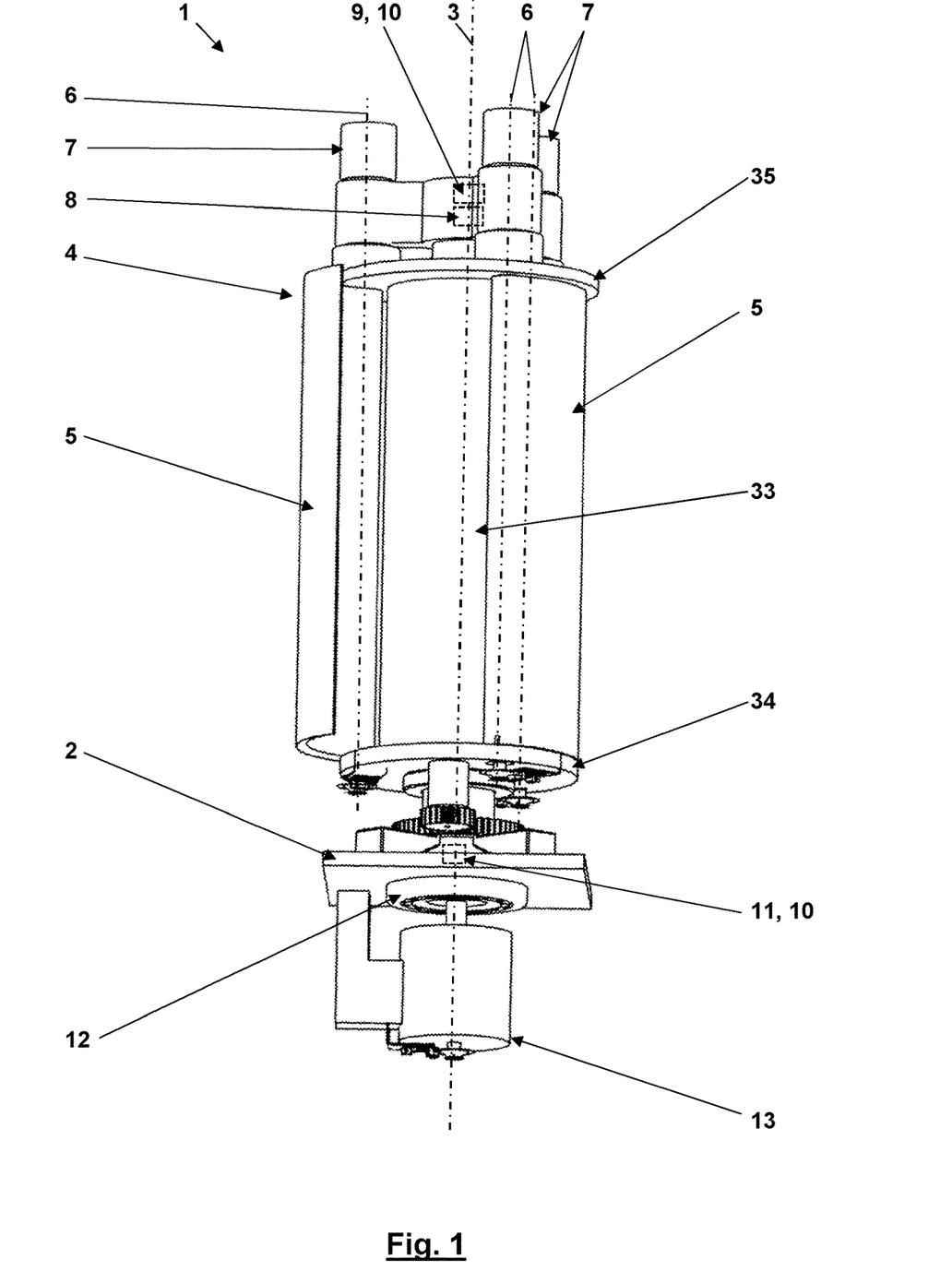
FIG. 1 is a perspective view of an embodiment of the flow power plant according to the invention made as a wind power plant, wherein aerodynamic cowlings of parts of the wind power plant are omitted.

The flow power plant 1 depicted in FIG. 1 comprises a rotor 4 mounted to a basis 2 for rotation about a vertical rotation axis 3. Three pivoting blades 5 are mounted to the rotor 4 for pivoting about pivoting axes 6 running parallel to the rotation axis 3. The pivoting axes 6 are arranged at a distance to the rotation axis 3 and rotationally symmetric with respect to the rotation axis 3. Per each pivoting blade 5, one electric machine 7 is arranged on the rotor 4 for applying torques between the respective pivoting blade 5 and the rotor 4 around the respective pivoting axis 6. Further, an energy buffer storage 8 which is only schematically depicted here, and a part 9 of a controller 10 which is also only schematically depicted here are arranged on the rotor 4. A further part 11 of the controller 10 is arranged on the basis 2. A communication between the parts 9 and 11 of the controller 10 takes place in a wireless way. In the basis 2, the rotor 4 is mounted via a rotation bearing 12, which supports moments of tilt which occur with the rotor 4 subjected to a flow about tilting axes running perpendicular to the rotation axis 3 in the area of the basis 4. Via a continuous connection shaft 16, the rotor 4 is mechanically connected beneath the basis 2 to a main generator 13 of the flow power plant 1. The controller 10 controls the electric machines 7 using the energy buffer storage 8 as it will be described in the following with reference to the FIGS. 3 to 7.

Figure 2:
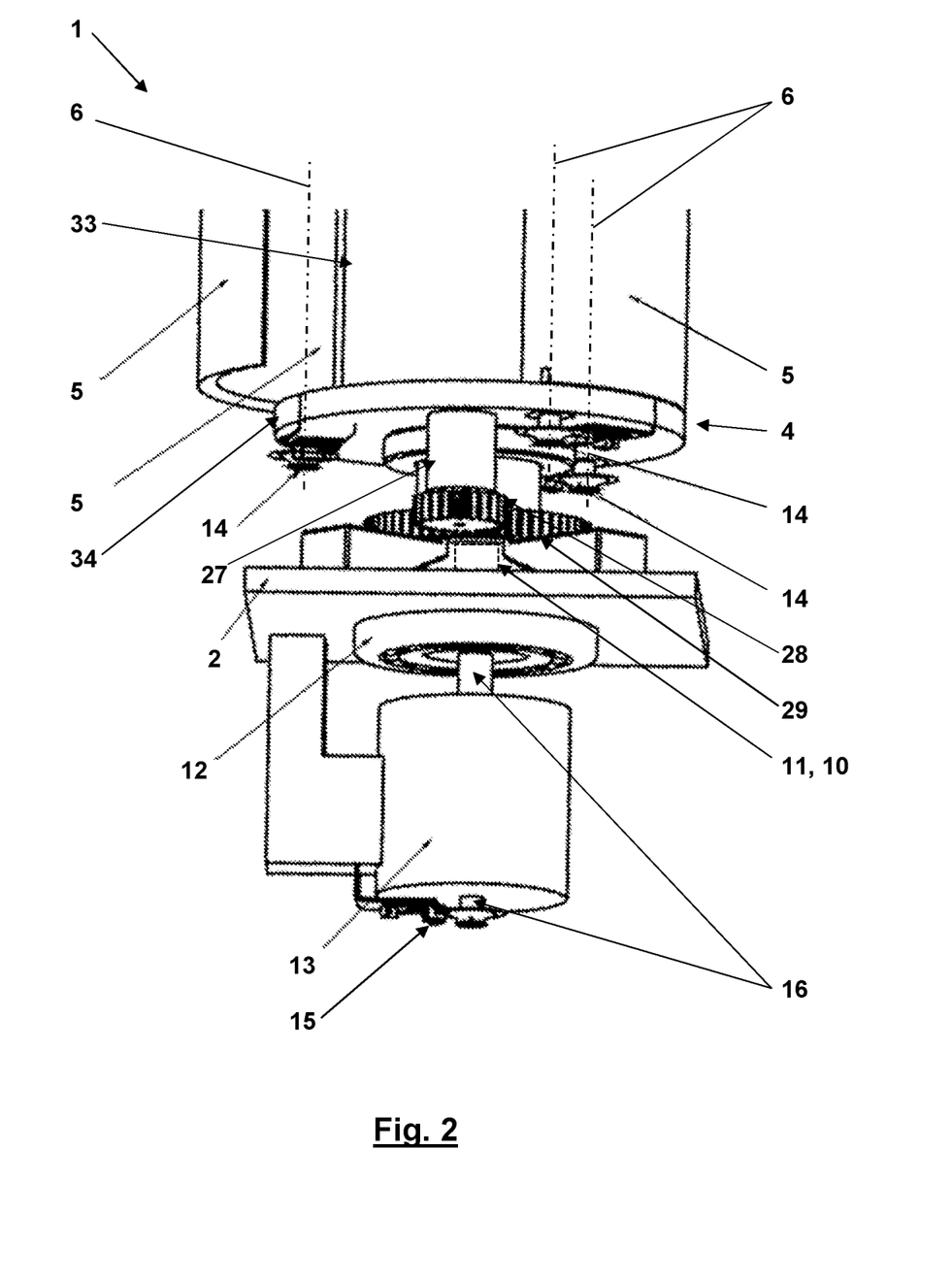
FIG. 2 is a view of a lower part of the wind power plant according to FIG. 1 out of another viewing direction than in FIG. 1.

In doing so, the controller 10 inter alia uses the present pivot angles of the pivoting blades 5 about their pivoting axes 6 with regard to the rotor 4 and the rotation angle of the rotor 4 about the rotation axis with regard to the basis 2. These pivoting angles and this rotation angle may be monitored by means of integrated sensors of the electric machines 7 and the main generator 13, respectively. FIG. 2 shows separate rotation angle transmitters 14 for the pivot angles of the pivoting blades 5 and a separate rotation angle transmitter 15 for the rotation angle of the rotor 4 or the connection shaft 16, respectively. Further, an electro motor 27 mounted to the rotor 4 is shown which, by means of a pinion 28, engages a sprocket 29 mounted to the basis 2 in a torque proof way. Normally, the electro motor 27 is idling and provides an as little as possible resistance against the rotation movement of the rotor 4 about the rotation axis 3. The controller 10 may operate the motor 27 with electric energy out of the energy buffer storage 8 to drive the rotor 4 for rotation about the rotation axis 3 with regard to the basis 2 in addition to aerodynamic forces onto its pivoting blades 5. In this way, the electric energy out of the energy buffer storage 8 is transformed into kinetic energy of the rotor 4 which the main generator 13 transforms into electric energy again. By means of the electro motor 27, a transfer of electric energy from the energy buffer storage on the motor 4 onto the main generator 13 at the basis 2 is possible without sliding contacts or the like. Further, by means of the operation of the electro motor 27 as a generator, the energy buffer storage 8 may be charged out of the rotation movement of the rotor 4 about the rotation axis 3. As an alternative to the parallel connection of the electro motor 27 to the main generator 13 between the rotor 4 and the basis 2 described up to here, the electro motor 27 may be mechanically connected in series with the connection shaft 16 between the rotor 4 and the main generator 13. For this purpose, the rotor 4 is to be mounted to the basis 2 for rotation about its rotation axis 3 separately from the connection shaft 16, and the sprocket 29 is to be connected in a torque proof way not to the basis 2 but to the connection shaft 16. Because, then, the torque of the rotor 4 is transferred to the main generator 13 via the electro motor 27, its pinion 28 is preferably mechanically lockable for those times in which the electro motor does not provide an additional torque between the rotor 4 and the connection shaft 16. A mechanical one-way clutch which mechanically supports the pinion 28 during those times may be provided for the pinion 28 at the rotor 4. In both cases, the electro motor 27 does not need to be put under current continuously. However, a mechanical one-way clutch for the pinion 28 may counteract the operation of the electro motor 27 as a generator for charging the energy buffer storage 8. In the complete flow power plant 1, the arrangement of the rotation angle transmitters 14, the electro motor 27 with the pinion 28 and the sprocket 29 at the basis 2 as well as the upper end of the rotor 4 according to FIG. 1 with the electric machines 7 are covered by aerodynamic cowlings not depicted here.

The flow power plant 1 depicted in FIGS. 1 and 2 is made as a wind power plant with a vertically oriented rotation axis 3 and with a rotor 4 extending upwardly from the basis 2. Here, only a transverse orientation of the rotation axis 3 with regard to an incoming flow is decisive. If an air flow, due to air guiding elements, always occurs in a fixed direction, the rotation axis 3 running transversely thereto may also be oriented horizontally.

In the following, the directions around the rotation axis 3 of the rotor 4 are indicated by clock times which an hour hand of a common analogous twelve-hour clock rotating about the rotation axis 3 and pointing in the respective direction would indicate.

Figure 3:
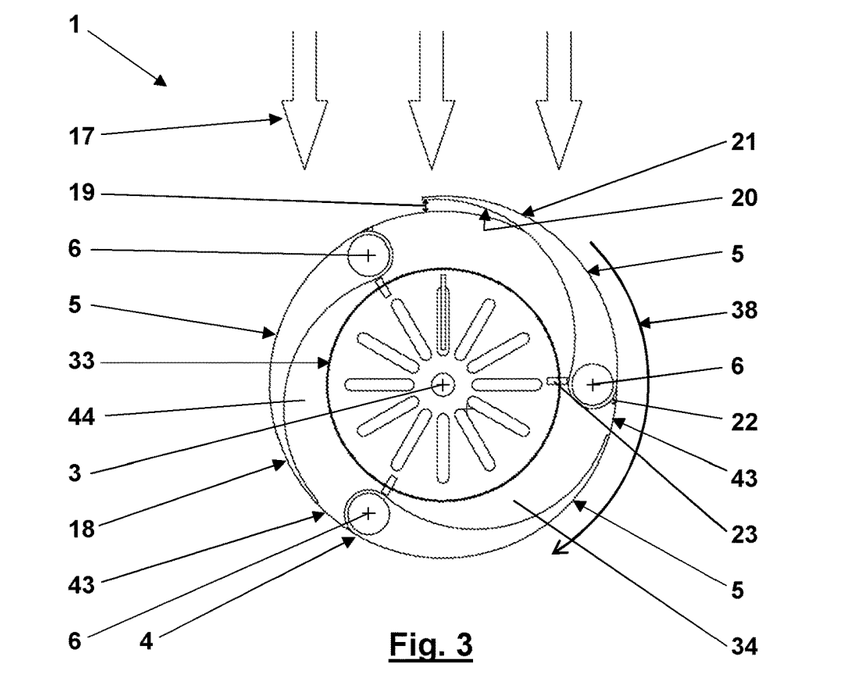
FIGS. 3 to 7 show the pivoting-out and re-pivoting-in of a pivoting blade with respect to a rotating rotor of the wind power plant according to FIGS. 1 and 2.

In FIG. 3, by means of arrows, a flow 17 flowing against the rotor 4 transversely to the rotation axis 3 from twelve o'clock is indicated. FIG. 3 shows two of the pivoting blades 5 in a state in which they are completely pivoted about their pivoting axes 6 in a cylindrical basic shape 18 of the rotor 4, which corresponds to pivot angles of the pivoting blades 5 with regard to the rotor 4 of zero. However, one pivoting blade 5 whose pivoting axis 6 in FIG. 3 with regard to the flow 17 flowing against the rotor 4 out of 12 o'clock is at 3 o'clock has already been pivoted to some extent out of the rotor 4 over a small pivot angle 19 by means of the associated electric machine. This pivoting-out is not yet induced by the flow 17 flowing against the rotor 4 but only a result of the control of the associated electric machine in order to increase the pivot angle 19 of the pivoting blade 5 against the flow 17 flowing against its outer side 21. Due to this, with regard to the incoming flow 17, early pivoting-out of the pivoting blade 5, the pivoting blade 5 is very early also subjected to the flow 17 at its inner side 20, what results in a usable torque onto the rotor 4 around the rotation axis 3.

Figure 4:
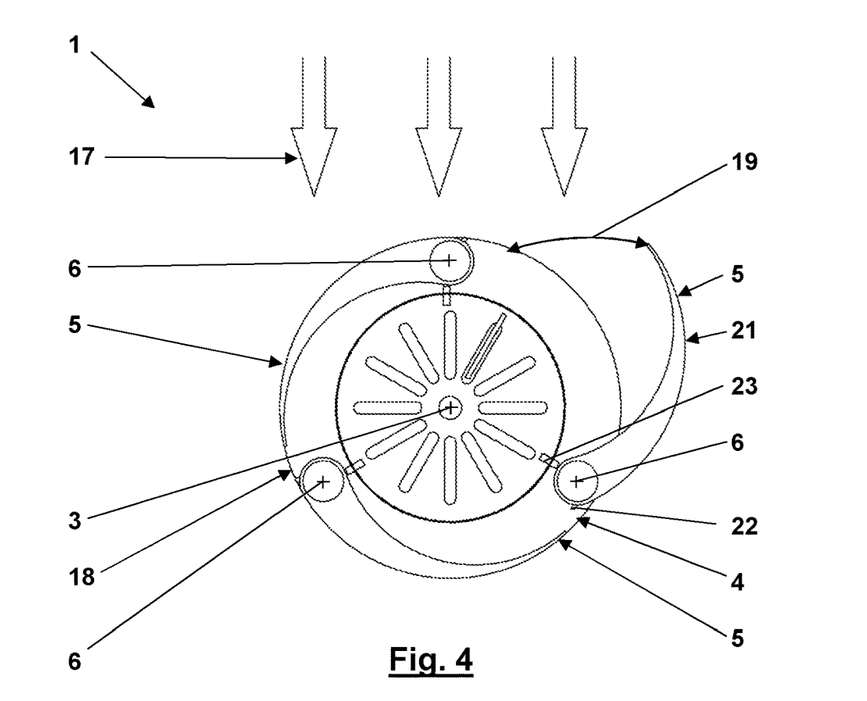

Due to the pivoting-out of the pivoting blade 5 effected by means of the associated electric machine 7 approximately in the 3 o'clock position of its pivoting axis 6, the pivoting blade 5 is thus very early caught by the flow 17 and further pivoted-out with regard to the rotor 4, as it can be seen in FIG. 4. Now the electric machine 7 may be used for purposefully decelerating the further pivoting-out of the pivoting blade 5 under the influence of the flow 17, wherein it is operated as a generator so that it generates electric energy. This electric energy is fed into the energy buffer storage 8. FIG. 4 shows the partially pivoted-out pivoting blade 5 with a position of its pivoting axis 6 at 4 o'clock, even before it is pivoted-out to such an extent that it is essentially oriented transversely to the flow 17 and, thus, a maximum transfer of kinetic energy out of the flow 17 onto the rotor 4 occurs.

Figure 5:
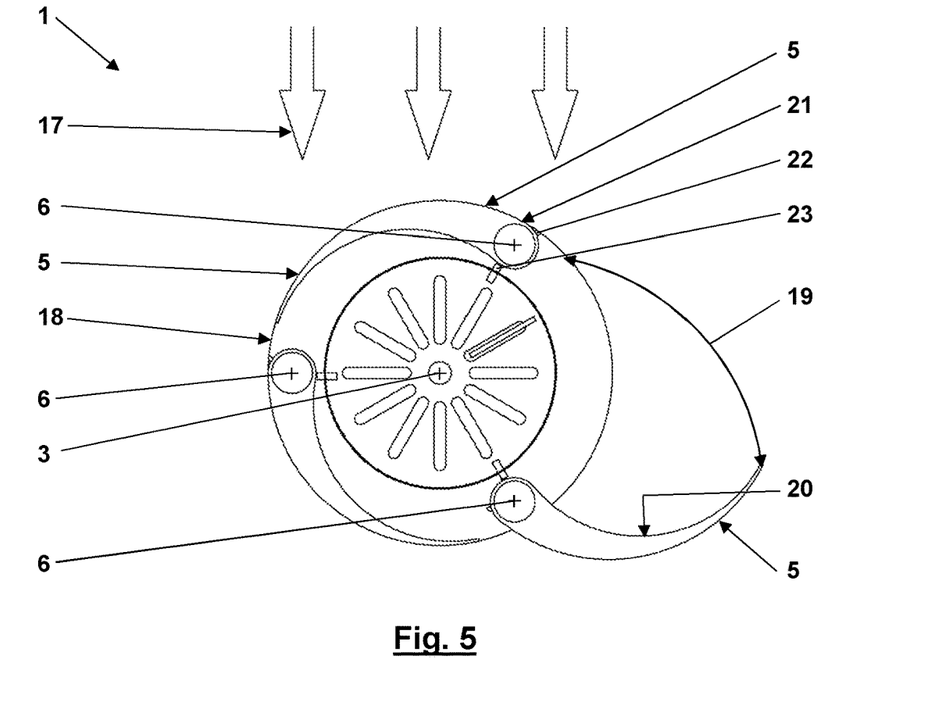
Figure 6:
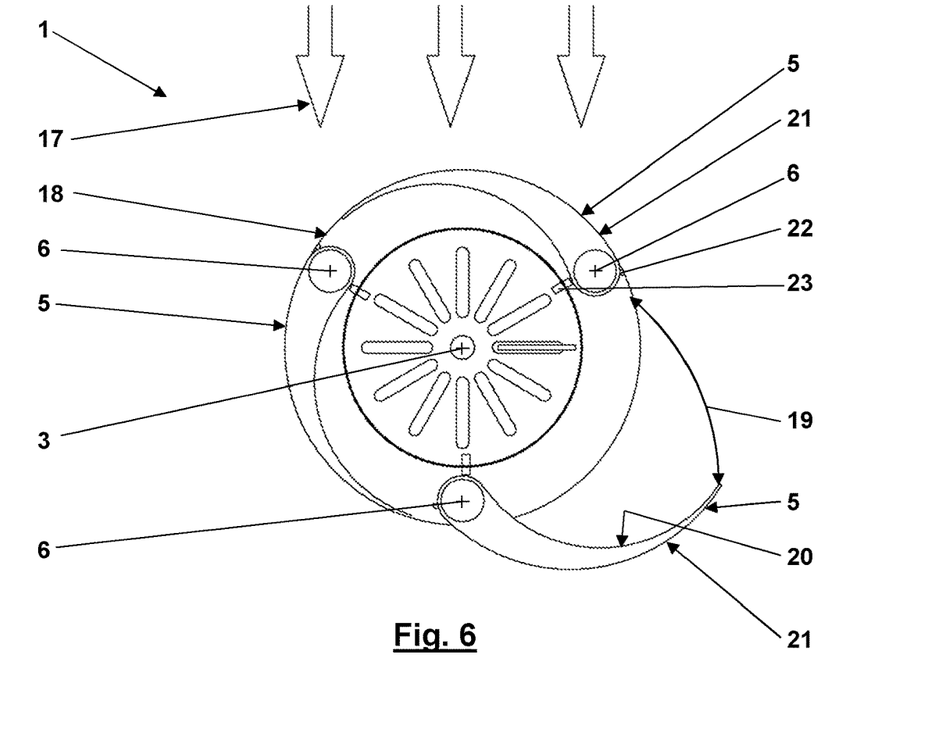

FIG. 5, which shows the pivoted-out pivoting blade 5 with its pivoting axis 6 at 5 o'clock, nearly represents this transverse orientation of the pivoting blade 5 with regard to the flow 17. In FIG. 6, which shows the pivoted-out pivoting blade 5 with its pivoting axis 6 at 6 o'clock, this transverse position of the pivoting blade 5 with regard to the flow 17 is reached. Here, the pivot angle 19 over which the pivoting blade 5 is pivoted out of the rotor 4 is already reduced as compared to FIG. 5 in order to compensate the rotation movement of the pivoting blade 5 with the rotor 4 around the rotation axis 3. This reduction of the pivot angle 19 against the flow 17 requires the application of a torque around the pivoting axis 6 with the associated electric machine 7. The electric energy required for this is taken out of the energy buffer storage 8 which has previously been charged upon decelerating the increase of the pivot angle 19 under operation of the electric machine as a generator. At the same time, decreasing the pivot angle 19 in order to orient the pivoted-out pivoting blade 5 transversely to the flow 17 means a rudder-movement of the pivoting blade 5 with regard to the rotor 4 in the flow 17 which has an accelerating effect on the rotor 4. Thus, the electric energy temporarily stored in the energy buffer storage 8 can be transferred to the rotor 4. If the energy buffer storage 8, despite this energy transfer, reaches its capacity limit, further electric energy may be transferred by means of the electro motor 27 according to FIG. 2. Vice versa, the energy buffer storage 8, if there is a danger that it is completely emptied, may be recharged by operation of the electro motor 27 as a generator.

Figure 7:
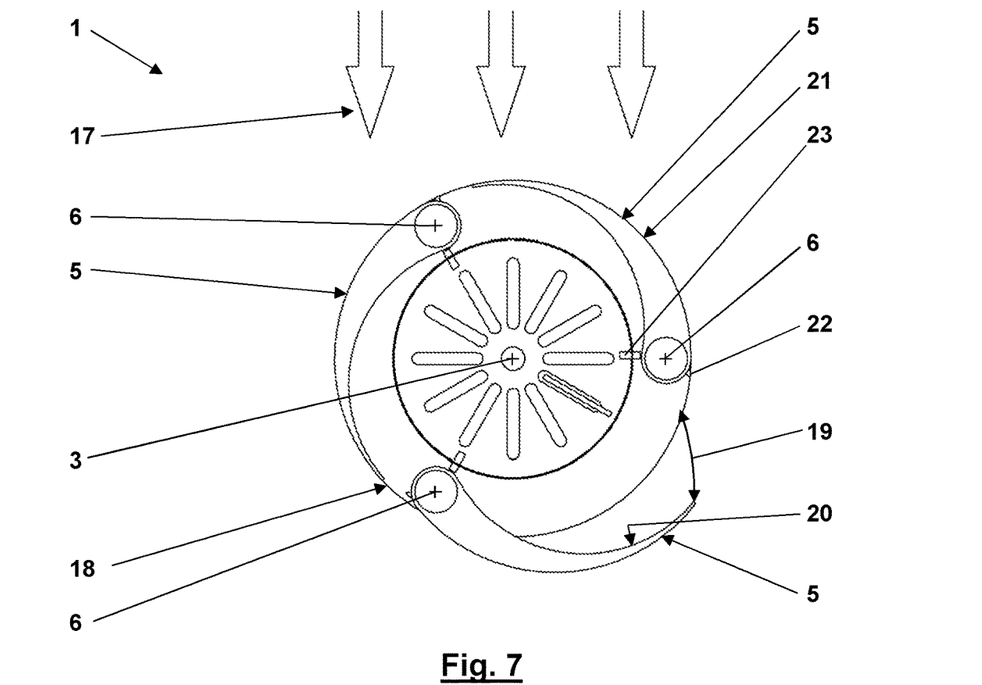

In FIG. 7, which shows the pivoted-out pivoting blade 5 with its pivoting axis 6 at 7 o'clock, the pivoting blade 5 is still essentially oriented transversely to the flow 17. For this purpose, the pivot angle 19, as compared to FIG. 6, is considerably further reduced by means of the associated electric machine. With the pivoting axis 6 approaching 9 o'clock, the previously pivoted-out pivoting blade 5 is completely pivoted into the basic shape 18 of the rotor 4 once again. In the flow power plant 1 according to the present disclosure, this pivoting-in is supported by the flow 17 acting upon the outer side 21 of the pivoting blade 5 at its end, if at all. This at least applies to the pivoting of the pivoting blade 5 depicted in FIGS. 3 to 7.

An automatic optimization of this pivoting may have the result that the pivoting blade 5 is to a larger extent pivoted-in by the influence of the flow 17 while its pivoting axis 6 is somewhere in the area between 8 and 11 o'clock. The automatic optimization may also have the result that the respective pivoting blade 5 at the beginning of its pivoting-out, i.e., already at a position of its pivoting axis 6 at about 3 o'clock, is pivoted-out to such an extent that a stop 22 at the pivoting blade 5 strikes against a counter-stop 23 at the rotor 4. This strike may be decelerated by means of the associated electric machine 7 operated as a generator. In the pivoting of the pivoting blade 5 according to FIGS. 3 to 7 the stops 22 to 23 do not strike against each other.

The course of the pivot angle 19 over the revolution of the pivoting axis 6 of the respective pivoting blade 5 around the rotation axis 3 is set by the controller 10 of the flow power plant 1 by controlling the respective electric machine in a generally free way. Practically, the setting occurs with the objective of a maximization of the energy transfer from the flow 17 onto the rotor 4. For this purpose, the controller 10 uses data obtained during previous revolutions of the rotor 4 around the rotation axis 3 with regard to the pivot angle 19 and the resulting electric energy put out by the main generator 13 according to FIGS. 1 to 2 to a load or an energy storage, while considering the direction and the strength of the incoming flow 17.

While the incoming flow 17 folds out the pivoting blade 5, the main generator 13 supplies the current adjustable at maximum. The pivoting blade reaches the maximum velocity of movement and is decelerated by the associated electric machine 7 operated as a generator. The transition to the rudder-movement goes along with a change in direction of the pivoting movement of the pivoting blade 5 with regard to the rotor 4. The associated electric machine 7 now operated as a motor drives this movement. For the transition, it is optimal, if the pivoting blade 5 gets to rest with regard to the rotor 4 before the direction of the currents in the electric machine 7 is inverted to operate it as a motor. In order to favor this rest, the current flowing from the main generator 13 is switched off to put the rotor 4 to idle. In this way, the pressure of the incoming flow 17 on the pivoting blade 5 is reduced. According to the settings of the controller 10, the current flowing from the main generator 13 is also switched on again, as soon as the current in the electric machine 7 operated as a motor is switched on. The predetermined course of the pivot angle 19 of the pivoting blade 5 is controlled by the current in the electric machine 7 and by the current from the main generator 13. The current from the main generator 13 is also always switched off, when during a revolution no electric energy is recovered from the incoming flow 17. This means that the current flowing from the main generator is used as a control factor.

Figure 8:
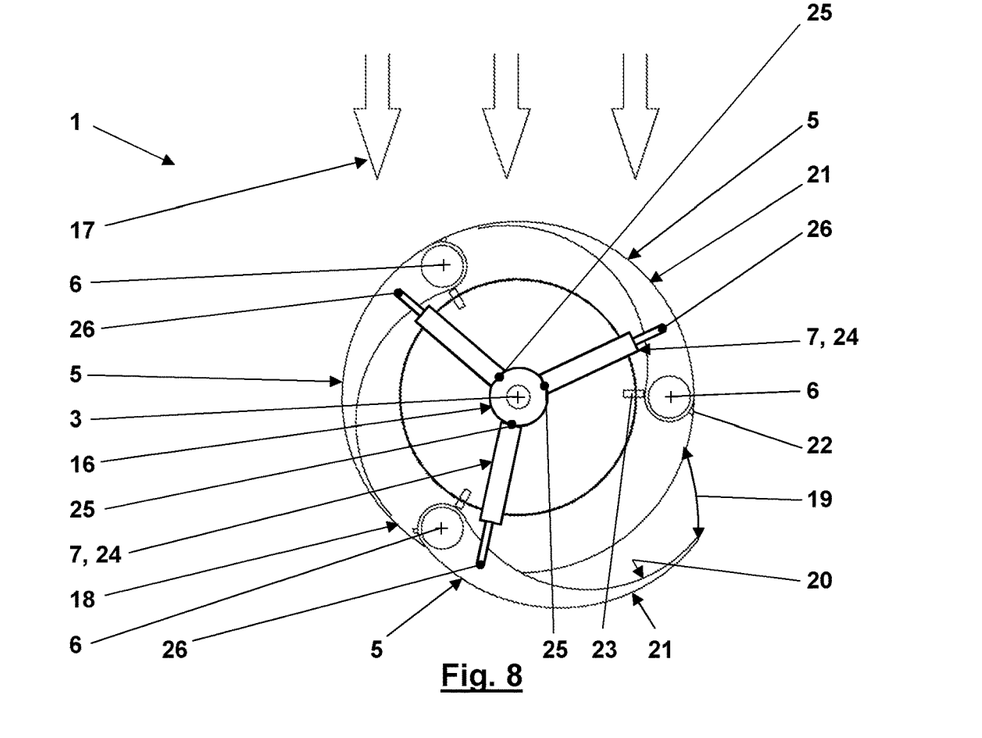
FIG. 8 is a detail of a further embodiment of the flow power plant according to the invention made as a water power plant.

FIG. 8 shows another embodiment of the flow power plant 1 in which the electric machines 7 for applying torques onto the pivoting blades 5 around their pivoting axes 6 with regard to the rotor 4 are no rotating electric machines, as they are depicted in FIG. 1, but linear motors 24. The linear motors 24 are each mounted for rotation about further pivoting axes 25 and 26 which run in parallel to the rotation axis 3 and the pivoting axes 6 to the rotor 4 and one of the pivoting blades 5. An extension of the linear motors 24 between the pivoting axes 25 and 26 pivots the pivoting blades 5 out of the rotor 4, wherein the respective pivot angle 19 is increased starting from zero. A contraction of the linear motors 24 results in a re-pivoting-in of the pivoting blades 5 into the rotor 4, wherein the respective pivot angle 19 is reduced to zero again. The connection shaft 16 leads to the main generator 13 which, in the flow power plant 1 according to FIG. 8, is arranged above the rotor 4 (but not depicted).

All flow power plants according to the present disclosure are to be oriented with the rotation axis 3 of their rotors 4 such that their pivoting blades 5 pivoted-out to a maximum extent are as fully faced as possible subjected to the flow. For example, in case of a water power plant in a flow channel with a larger width than height, it may thus be suitable to orient the rotation axis 3 horizontally transversely to the incoming flow. The flow power plant according to the present disclosure is suitable for being operated free-standing in an incoming flow which flows against its rotor over its entire cross-section in a generally equal way. However, this is no precondition for a suitable application of the flow power plant according to the present disclosure. The controller of the flow power plant according to the present disclosure may also optimize its operation, if its rotor on its side at which the pivoting blades return against the flow are subjected to the flow to a smaller extent or even not at all. In this case, the automatic optimization of the course of the pivot angle of the pivoting blades may have other results than with a rotor which is uniformly subjected to the flow over its entire cross-section.

In each of the FIGS. 3 to 8, only one of the pivot angles 19 of one of the three pivoting blades 5 is depicted as differing from zero, because only the course of the pivot angle 19 of this one pivoting blade 5 is looked at in detail. However, this does not mean that the pivot angles 19 of several pivoting blades 5 may not differ from zero at the same time. Quite to the contrary, as a rule, the pivot angles 19 of at least two of the pivoting blades 5 of a flow power plant 1 according to the present disclosure with three or more pivoting blades 5 will be larger than zero at the same time.

Figure 9:
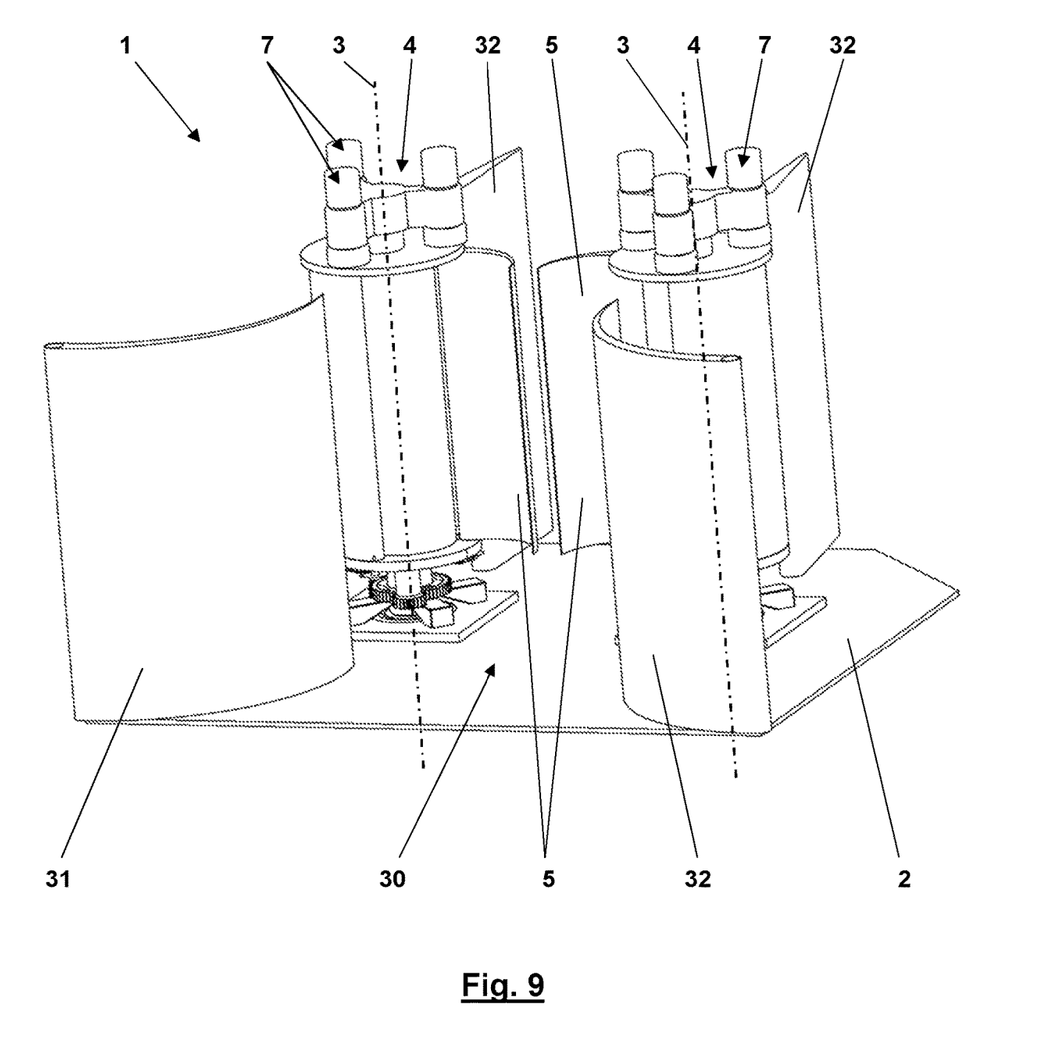
FIG. 9 shows an embodiment of the flow power plant according to the invention with two mirror-symmetrically arranged and counter-rotating rotors.

The embodiment of the flow power plant 1 according to the present disclosure depicted in FIG. 9 comprises two rotors 4 in a mirror-symmetrical arrangement with regard to a longitudinal center plane of a flow channel 30. The flow channel 30 is defined by flow guiding elements 31 and 32. The rotation axes 3 of the rotors 4 are arranged on both sides of the flow channel 30 and parallel with regard to one another. The distance of the rotation axes 3 is so big that the completely pivoted-out pivoting blades 5 at the rotors 4 rotating in opposite directions about their rotation axes 3 do just not collide with one another even if they simultaneously pass through between the rotation axes 3. This has the effect that the completely pivoted-out pivoting blades 5 temporarily nearly completely block the flow channel 30. A flow through the flow channel 30 is retained by the pivoting blades 5 and thus applies a high torque onto the rotors 4 around their rotation axes 3. Flow guiding elements 31 and 32 which shield a part of the rotor 4 against the flow 17 may also be provided with a flow power plant 1 only having one rotor 4 to reduce the flow against the rotor on its side returning against the flow 17 and to increase the flow against the rotor on its side advancing together with the flow 17.

Figure 10:
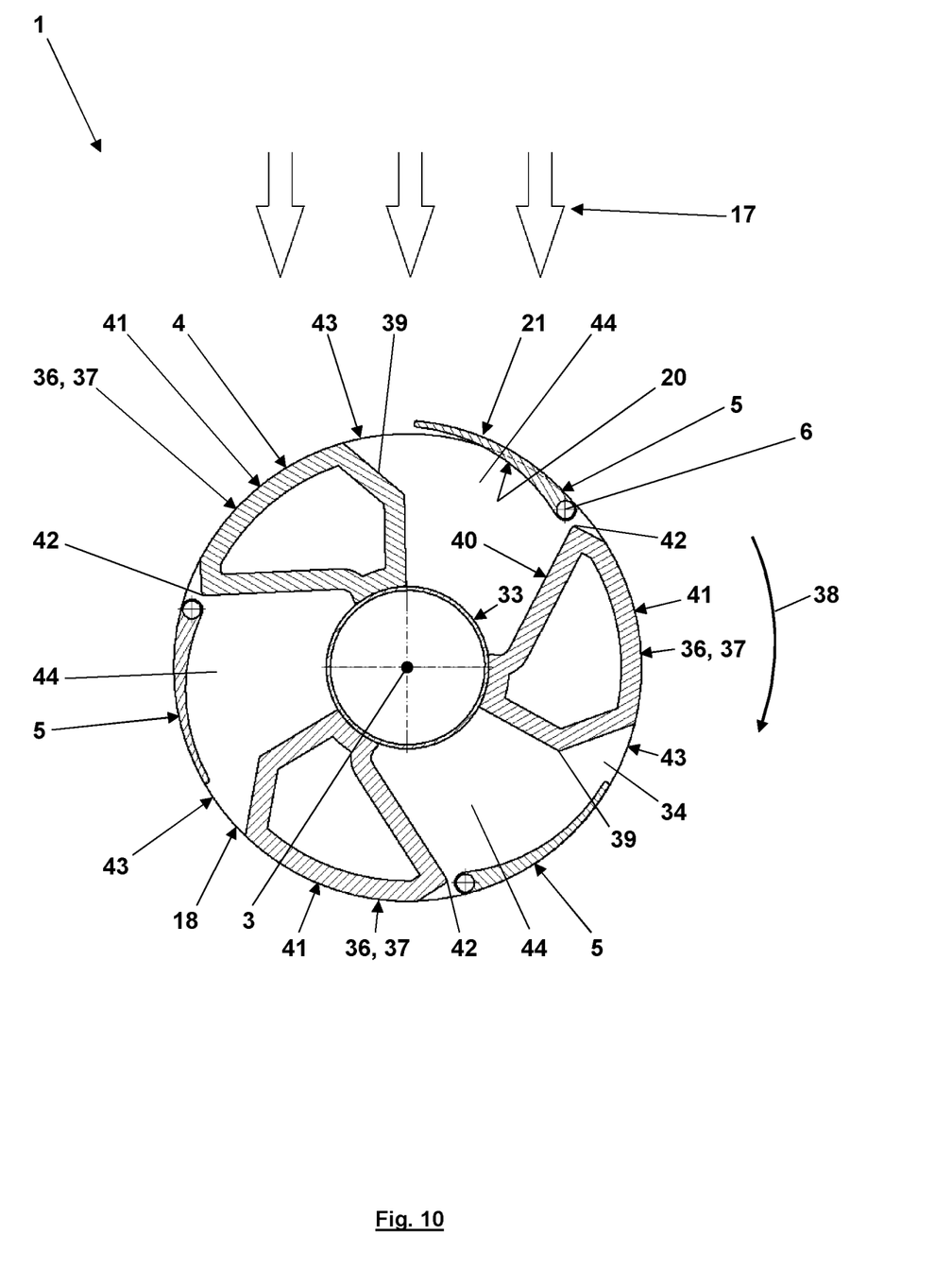
FIG. 10 shows, in a view corresponding to FIG. 3, a further embodiment of the flow power plant according to the invention whose rotor comprises additional flow bodies which are effective as rigid blades.

In the embodiments of the flow power plants 1 according to the previous Figures, the rotor 4 has an inner cylinder 33 between end plates 34 and 35 rigidly connected to the inner cylinder, wherein the pivoting blades 5 are mounted between the end plates 34 and 35 for pivoting about their pivoting axes 6. In the embodiment of the flow power plant 1 depicted in FIG. 10, in a view corresponding to FIG. 3, the rotor 4, besides the inner cylinder 33 and the end plates 34 and 35 comprises additional flow bodies 36. The flow bodies 36 are arranged around the inner cylinder 33 in a rotationally symmetric way with regard to the rotation axis 3. Here, they are made as hollow profile sections 37 of a low mass and a high stiffness, and they comprise a front side pointing forward in a rotation direction 38 of the rotor 4 and a back side 40 facing against the rotation direction. The flow bodies 36 are formed as rigid blades of the rotor 4. Due to the flow 17 flowing against the flow bodies 36 transversely to the rotation axis 3, the rotor 4 would, thus, be set to rotation in the rotation direction 38 even without the pivoting blades 5. At the outer circumference of the cylindrical basic shape 18, which coincides with the outer circumference of the end plates 34 and 35, the flow bodies 36 extend between their front sides 39 and trailing edges 42 of their back sides 40 over a good 50° around the rotation axis here. The pivoting axis 6 of the pivoting blades 5, which extend along the outer circumference of the basic shape 18 over 45° each here, run in the area of the trailing edges 42 and parallel thereto. Thus, even the completely pivoted-in pivoting blades 5, against the rotation direction 38, end at a distance to the front side 39 of the following flow body 6. Because of this, openings 43 remain which lead into chambers 44 in the interior of the rotor 4. The part of the flow 17 flowing into the chambers 44 support the pivoting-out of the pivoting blades 5 as long as they are facing the flow 17 with their outer sides 21. The width of the openings 43 between the pivoted-in pivoting blades 5 and the front sides 39 of the flow bodies 36 is about 15° around the rotation axis 3 here.

Smaller openings 43 and chambers 44 are also present in the embodiments of the flow power plant 1 according to FIGS. 1 to 9, see the reference numerals in FIG. 3.

Many variations and modifications may be made to the preferred embodiments of the invention without departing substantially from the spirit and principles of the invention. All such modifications and variations are intended to be included herein within the scope of the present invention, as defined by the following claims.

I claim:

1. A flow power plant comprising
a rotor configured to rotate about a rotational axis;
a plurality of rotor blades, each of the plurality of rotor blades configured to rotate about a respective pitch axis parallel to the rotational axis between a first position where the rotor blade is pivoted toward the rotational axis and a second position where the rotor blade is pivoted away from the rotational axis;
a plurality of electric machines mounted to the rotor, each of the plurality of electric machines being operably connected to a respective one of the plurality of rotor blades and configured to apply or receive a torque about the respective pitch axis of the respective one of the plurality of rotor pivoting blades;
a controller configured to individually control a pitch angle of each of the plurality of rotor blades;
wherein each of the plurality of electric machines is operable as a motor and a generator; and
wherein the controller is configured to individually control each of the plurality of electric machines such that each of the plurality of rotor blades pivots along a respective determined trajectory from the first position to the second position, the respective determined trajectory being determined for each revolution of the rotor.

2. The flow power plant of claim 1, wherein the controller is further configured to automatically optimize the respective determined trajectory.

3. The flow power plant of claim 2, wherein the automatic optimization is configured to obtain a maximum power transfer from a flow impacting the rotor.

4. The flow power plant of claim 3, wherein the maximum power transfer is determined based on:
a plurality of energy values transferred to the rotor during previous revolutions of the rotor,
a plurality of flow parameter values obtained during previous revolutions of the rotor, and
at least one prior determined trajectory obtained during at least one previous revolutions of the rotor.

5. The flow power plant of claim 1, wherein the controller is further configured to:
begin pivoting a respective rotor blade of the plurality of rotor blades toward the second position prior to the respective rotor blade engaging with a flow of fluid, and
to control a pitch angle of the respective rotor blade such that it is not in the first position while the respective rotor blade remains engaged with the flow of fluid.

6. The flow power plant of claim 1, wherein the controller is connected to a vibration sensor and configured to individually control the plurality of electric machines such that vibrations corresponding to a fundamental rotation frequency of the rotor and a harmonic rotational frequency of the rotor are reduced.

7. The flow power plant of claim 1, wherein each of the plurality of electric machines comprises a linear motor.

8. The flow power plant of claim 1, wherein an energy storage device is mounted to the rotor and configured to store electric energy generated by the plurality of electric machines when the plurality of electric machines are operated as generators.

9. The flow power plant of claim 8, further comprising a main electric machine operably connected to the rotor and configured to receive a stored electric energy from the energy storage device, wherein the stored electric energy is used to operate the main electric machine as a motor to apply a torque to the rotor.

10. The flow power plant of claim 1, wherein the controller is further configured to pivot each of the plurality of rotor blades from the second position to the first position such that the rotor is accelerate.

11. The flow power plant of claim 1, further comprising a main electric machine operably connected to the rotor and configured to operate as a motor and a generator, the main electric machine being electrically connected to an electric load and/or an energy storage device.

12. The flow power plant of claim 11, wherein the controller is further configured to measure an electric power output of the main electric machine when it is operated as a generator.

13. The flow power plant of claim 11, wherein the controller is configured to control the main electric machine such that an angular velocity of the rotor is optimized.

14. The flow power plant of claim 11, wherein the main electric machine is operated as a motor to drive the rotor.

15. The flow power plant of claim 1, wherein the plurality of rotor blades comprises 3 to 6 rotor blades.

16. The flow power plant of claim 1, wherein the rotor further comprises;
  an inner cylinder arranged coaxially with the rotational axis;
    a plurality of flow bodies arranged circumferentially about the inner cylinder and configured as fixed blades of the rotor;
    wherein each of the plurality of flow bodies is provided with a front side facing into a direction of rotation of the rotor, a rear side facing against the direction of rotation, and a trailing edges positioned radially outward with respect to the rotational axis; and
    wherein each of the respective pitch axes are arranged adjacent to a respective trailing edge of the plurality of flow bodies.

17. The flow power plant of claim 16, wherein the plurality of rotor blades are arranged such that, in the first position, an openings remains between each of the plurality of rotor blades and the front sides of the plurality of flow bodies.

18. The flow power plant of claim 1, further comprising
  a second rotor configured to rotate about a second rotational axis;
  a second plurality of rotor blades, each of the second plurality of rotor blades configured to rotate about a respective pitch axis parallel to the second rotational axis between a first position where the rotor blade is pivoted toward the second rotational axis and a second position where the rotor blade is pivoted away from the second rotational axis; and
  a flow channel having a longitudinal center plane;
  wherein the rotor and the second rotor are mirror-symmetrically arranged with respect to the longitudinal center plane of the flow channel and rotate in opposite directions about the rotating axis and the further rotational axis, respectively.

19. The flow power plant of claim 18, wherein the flow channel is delimited by flow guiding elements.

20. The flow power plant of claim 18, wherein:
  the plurality of rotor blades is a first plurality of rotor blades; and
  the flow channel is essentially blocked by pivoting-out the pivoting rotor blades of the first plurality of rotor blades and the second plurality of rotor blades into their respective second positions.

\* \* \* \* \*